(12) United States Patent
Ma et al.

(10) Patent No.: US 11,343,234 B2
(45) Date of Patent: May 24, 2022

(54) MULTI-DOMAIN EXTENSION TO CLOUD SECURITY

(71) Applicant: Cisco Technology, Inc., San Jose, CA (US)

(72) Inventors: Xueqiang Ma, Sunnyvale, CA (US); Dave Persaud, San Jose, CA (US); Kalyan Ghosh, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 181 days.

(21) Appl. No.: 16/709,188

(22) Filed: Dec. 10, 2019

(65) Prior Publication Data

US 2021/0176224 A1    Jun. 10, 2021

(51) Int. Cl.
*H04L 29/06* (2006.01)

(52) U.S. Cl.
CPC .......... *H04L 63/0485* (2013.01); *H04L 63/20* (2013.01)

(58) Field of Classification Search
CPC ............................ H04L 63/0485; H04L 63/20
USPC ........................................................ 713/160
See application file for complete search history.

(56) References Cited

U.S. PATENT DOCUMENTS

| | | | | |
|---|---|---|---|---|
| 7,779,459 B2* | 8/2010 | Mao | ..................... | H04L 63/0227 726/11 |
| 8,726,298 B1* | 5/2014 | Desai | ..................... | G10H 7/002 719/321 |
| 10,491,569 B1* | 11/2019 | Powell, III | .......... | H04L 63/0428 |
| 2006/0179326 A1* | 8/2006 | Leung | ..................... | H04L 63/10 713/193 |
| 2009/0161676 A1* | 6/2009 | Breau | ................. | H04L 63/0263 370/392 |
| 2014/0114672 A1* | 4/2014 | Wright | ................... | G16H 30/20 705/2 |
| 2018/0115586 A1* | 4/2018 | Chou | ..................... | G06F 8/656 |
| 2018/0212928 A1* | 7/2018 | Gerber | ............... | H04L 63/0209 |
| 2019/0014025 A1* | 1/2019 | Maloy | ................ | H04L 43/0811 |

OTHER PUBLICATIONS

Cisco, "Cisco ACI Multi-Site Architecture", Cisco White Paper, Jun. 2019, 98 pages.

(Continued)

*Primary Examiner* — Michael S McNally
(74) *Attorney, Agent, or Firm* — Edell, Shapiro & Finnan, LLC

(57) ABSTRACT

Presented herein are methodologies for implementing multi-domain cloud security and ways to partition end-points in data center/cloud network topologies into hierarchical domains to increase security and key negotiation efficiency. The methodology includes receiving, from a first endpoint, at a cloud security protocol stack, a packet encrypted in accordance with a cloud security key negotiated between the first endpoint and a second endpoint; extracting a cloud security globally unique domain-id from the packet; querying a cloud security domain repository using the cloud security globally unique domain-id as an index to identify a first cloud security domain, among a plurality of cloud security domains, to which the first endpoint and the second endpoint belong; and selecting the first cloud security domain to process the packet.

20 Claims, 6 Drawing Sheets

(56) References Cited

OTHER PUBLICATIONS

Wikipedia, "Virtual routing and forwarding", last edited Dec. 30, 2020, 3 pages; https://en.wikipedia.org/wiki/Virtual_routing_and_forwarding.

Wikipedia, "Graph partition", last edited Aug. 31, 2021, 8 pages; https://en.wikipedia.org/wiki/Graph_partition.

CJ. Bernardos, Ed. et al., "Multi-domain Network Virtualization", draft-bernardos-nmrg-multidomain-00, NM RG, Mar. 11, 2019, 36 pages.

Open Networking Foundation, "SDN Architecture for Transport Networks", ONF TR-522, Mar. 15, 2016, 17 pages.

* cited by examiner

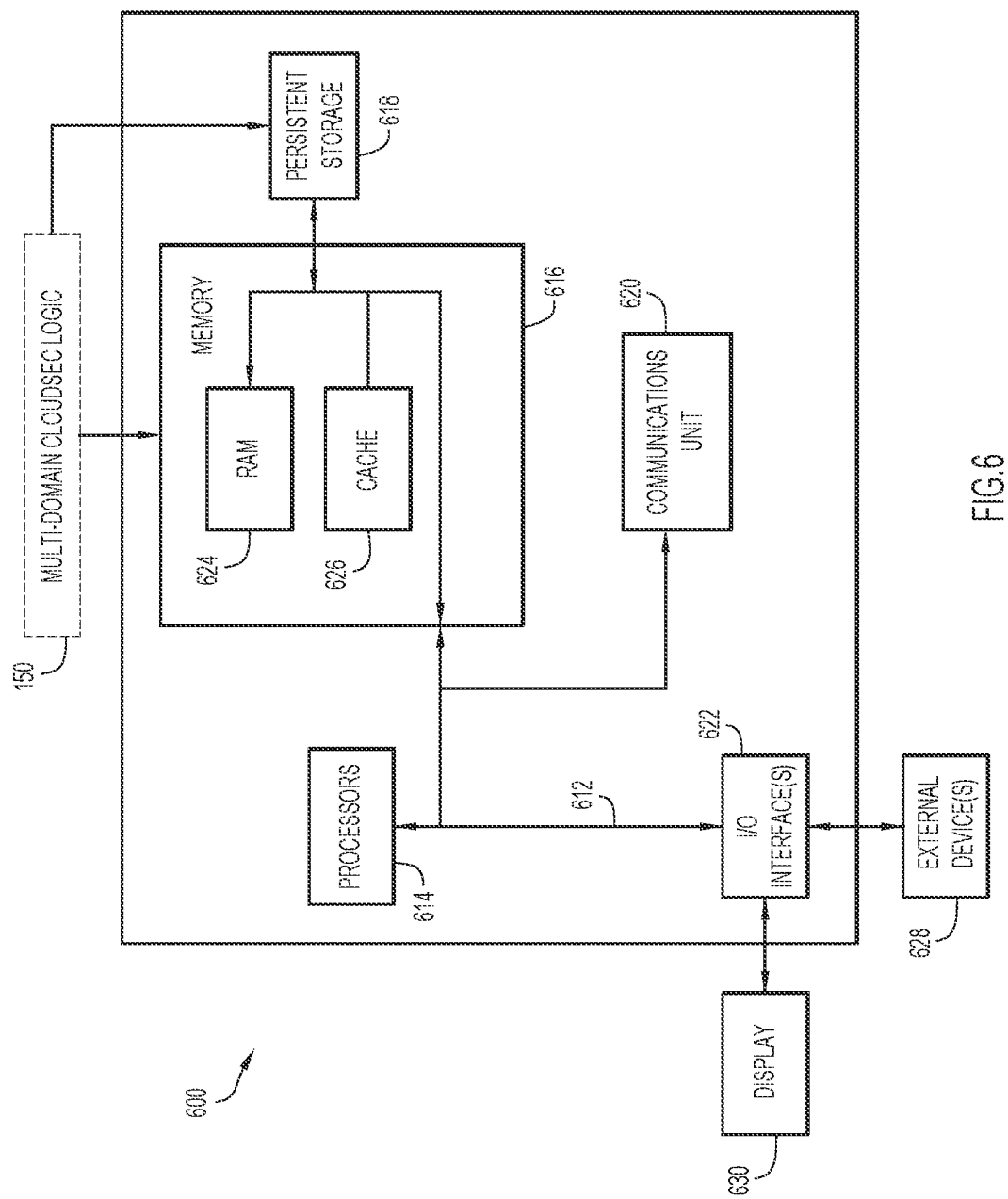

MULTI-DOMAIN EXTENSION TO CLOUD SECURITY

TECHNICAL FIELD

The present disclosure relates to line-rate endpoint-to-endpoint security across multiple domains.

BACKGROUND

Cloud security ("CloudSec") technology is an efficient, line-rate encryption/decryption security solution and infrastructure that can be deployed for multi-site data centers across a wide area network (WAN). In such an infrastructure, participants (e.g., hosts or endpoints on hosts) communicate with each other to negotiate and propagate transmit/receive (Tx/Rx) keys. As data center network fabrics extend their geographical boundaries, and as hybrid-cloud topologies further interconnect on-premise data centers and public clouds, not only do different types of sites need to be connected via the WAN, but network devices within a given site might also need to be connected. Moreover, connections via/over the WAN may be with different types of topologies, such as a remote-leaf, which can be connected to a spine via the WAN. Similar cases exist for virtual-leaf/multi-pod and hybrid-cloud architectures. Moreover still, CloudSec is becoming more relied upon to enforce policy across multi-domains.

BRIEF DESCRIPTION OF THE DRAWINGS

FIG. 6 depicts a device (e.g., a controller) that executes multi-domain CloudSec logic in accordance with an example embodiment.

DESCRIPTION OF EXAMPLE EMBODIMENTS

Overview

Figure 1:
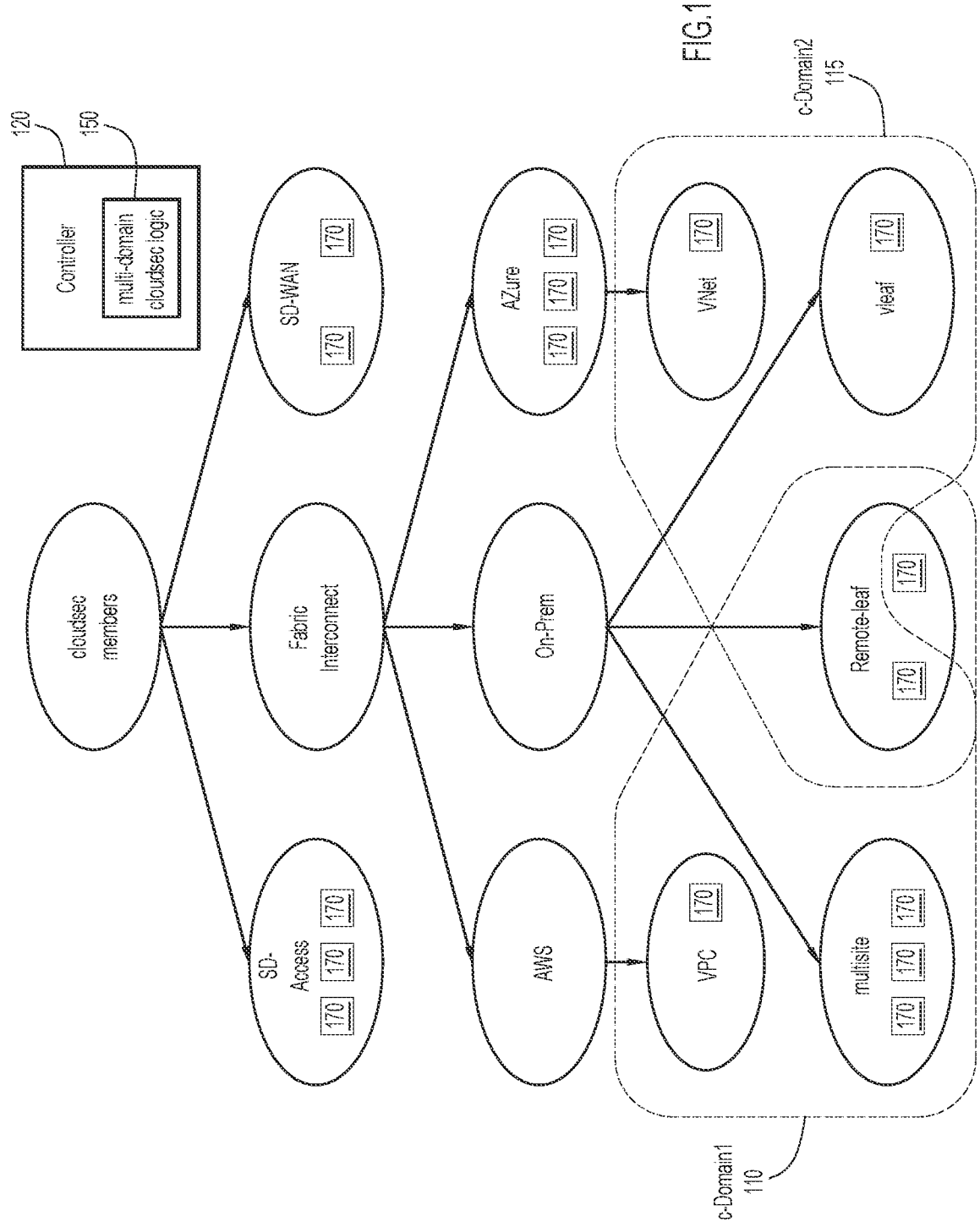
FIG. 1 shows a hierarchy of various architectures that can be overlaid with multiple CloudSec domains (C-domains) in accordance with an example embodiment.

Presented herein are methodologies for implementing multi-domain cloud security. The methodology includes receiving, from a first endpoint, at a cloud security protocol stack, a packet encrypted in accordance with a cloud security key negotiated between the first endpoint and a second endpoint; extracting a cloud security globally unique domain-id from the packet; querying a cloud security domain repository using the cloud security globally unique domain-id as an index to identify a first cloud security domain, among a plurality of cloud security domains, to which the first endpoint and the second endpoint belong; and selecting the first cloud security domain to process the packet.

A device or apparatus is also described. The device may be a SAS, or some other device. The device may include an interface unit configured to enable network communications, a memory, and one or more processors coupled to the interface unit and the memory, and configured to: receive, from a first endpoint, at a cloud security protocol stack, a packet encrypted in accordance with a cloud security key negotiated between the first endpoint and a second endpoint; extract a cloud security globally unique domain-id from the packet; query a cloud security domain repository using the cloud security globally unique domain-id as an index to identify a first cloud security domain, among a plurality of cloud security domains, to which the first endpoint and the second endpoint belong; and select the first cloud security domain to process the packet.

EXAMPLE EMBODIMENTS

Embodiments described herein are arranged to support many different types of network topologies that serve different purposes in, e.g., distributed and hybrid data centers that may have different types of security requirements, all of which may benefit from CloudSec technology to protect data that might be transported across a public network.

In accordance with the described embodiments, endpoint devices (or "endpoints," which could be virtual) are grouped into multiple segregated CloudSec domains (or "C-domains") to effectively partition a single CloudSec name space to support multiple CloudSec instances, which may work concurrently and independently without affecting each other. Such partitioning is beneficial in that endpoints in a CloudSec group often need to exchange their security parameter and operational status, which is used to determine whether to trigger a rekey event. Without partitioning, if a participant's security parameter and operational data in one CloudSec group is forwarded to another CloudSec group by mistake, it would inadvertently affect the functionality of other CloudSec groups, possibly causing disruption throughout a network.

Embodiments described herein also address the possibility of a given endpoint participating in multiple C-domains and, in that regard, embodiments provide an approach to differentiate CloudSec protocol packets for different instances, and maintain different states of each of the concurrently running CloudSec state machines.

FIG. 1 shows a hierarchy of various architectures that can be overlaid with C-domains in accordance with an example embodiment. More specifically, and in accordance with an embodiment, a controller 120, such as a software defined network (SDN) controller or multi-site orchestrator (MSO) operates, runs, or executes multi-domain CloudSec logic 150 that partitions members (e.g., respective hosts, or endpoints, 170), which rely on CloudSec technology, into multiple groups (C-domains) based on respective topology and security characteristics. A partitioned CloudSec approach enables support for a multi-domain networking environment as well as a multi-subdomain networking environment. As shown in FIG. 1, CloudSec members (i.e., selected endpoints 170) may be distributed and hierarchically arranged across a multitude of architectures or object classes, including a software defined access network, or a software defined WAN. A fabric interconnect technology might interconnect Amazon Web Services (AWS) (which itself might support virtual private cloud(VPC) technology), Azure web services (which itself might support Virtual networking (VNet)), and on-premise deployments including multisite deployments, remote leaf deployments, and virtual leaf (vleaf) deployments.

In accordance with an embodiment, a C-domain or (sub) domain containerizes all members in a same set for purposes of CloudSec key negotiation, and enables transmitting and receiving encrypted data among the domain members.

As further shown in FIG. 1, a given C-domain can cover multiple technologies as indicated by C-domain1 110, and C-domain2 115. Notably, a given endpoint, e.g., 171, can be a member of two C-domains at the same time, namely C-domain1 110 and C-domain2 115.

In one possible implementation, partitioning of endpoints into C-domains may proceed as follows. Multi-domain CloudSec logic 150 may undertake a first-level partition according to security considerations. Multi-domain CloudSec logic 150 may further divide each of the first set of C-domains into their sub C-domains. One example of this multi-level partition would be to first partition a cross-region data center into several geographically separated sites, each site being a C-domain. Multi-domain CloudSec logic 150 can further partition each site C-domain into several multi-POD (point of deployment) fabrics, each POD being a sub C-domain. Multi-domain CloudSec logic 150 can make yet a further partition of a POD into a group of local fabric nodes and several remote leafs, each remote leaf and the local group of nodes all being sub-C-domains of the POD C-domain.

By partitioning a single CloudSec infrastructure into C-domains, CloudSec communications are made more efficient and more scalable. For instance, assume partitioning a C-domain of N participants into K sub C-domains at each node. As a result, instead of forming mesh communication between all N participants, it is now possible to form mesh communications between each of the N/K members within each domain, and then establish communication between these domains. As a further result, encryption/decryption key negotiation messages are reduced from $N^2$ to $K(N/K)^2$ which is $N^2/K$, essentially cutting the message overhead into only 1/K of the original cost. In general, if a C-domain expansion tree has a height h and each interior node has K children, then each leaf C-domain has only $1/K^h$ of the original key exchange cost. In the case, for example, of a cross-region on-prem data center, it is possible to split it into 10 sites, and each such site into 10 pods, then in such a data center alone, K=10, h=2, it is possible to achieve two orders of magnitude ($1/10^2=1/100$) of reduction in key exchange cost. Multi-domain CloudSec logic 150 can perform similar partitions in public clouds based on region, AWS virtual private cloud (VPC), Azure VNet, and subnet etc.

It is also possible, in accordance with an embodiment, to achieve particular optimization in specific network topologies. For example, with a CloudSec deployment on remote-leaf switches and with a single instance/domain of a CloudSec solution, all the remote-leaf switches, as well as their peer spine switches will be members of the single CloudSec instance/domain, and a central message broker, e.g., an SDN controller (e.g., controller 120), may act as a message broker to relay generated encryption/decryption keys, as well as key deployment status from each member to all other members. However, it is noted that each pair of remote leaf and its peer spine forms a point-to-point topology which can have its own key, encryption and decryption algorithms, and rekey frequency. As such, if such spine/leaf switch pairs are partitioned into respective C-domains, each such C-domain can run a separate CloudSec instance with its own key and deployment status repository.

Adding domain instance support in CloudSec has significant benefits. First, it increases CloudSec key negotiation efficiency. For instance, consider one fabric interconnect site that has n remote-leaf switches. On the one hand, if all such switches were under a single instance of CloudSec, a central message broker would propagate key negotiation messages from each member to all other members, e.g., across a WAN, thus creating $O(n^2)$ messages. Notably, however, it is likely that there are many unnecessary messages transmitted as there are different keys and encryption/decryption algorithms between each pair of spine and remote leaf, as remote leaves do not communicate with one another. On the other hand, if such a topology is partitioned into n domains with each remote leaf in a separate domain, then each domain has only two members so the messages needed for key negotiation will be a constant, and the total key negotiation messages are effectively reduced from $O(n^2)$ to $O(n)$. This saves message storage space as well as message processing time. The same partition technique can be used between participants in a multi-site CloudSec instances, participants in multi-pod CloudSec instances, and participants in v-leaf CloudSec instances.

Figure 2:
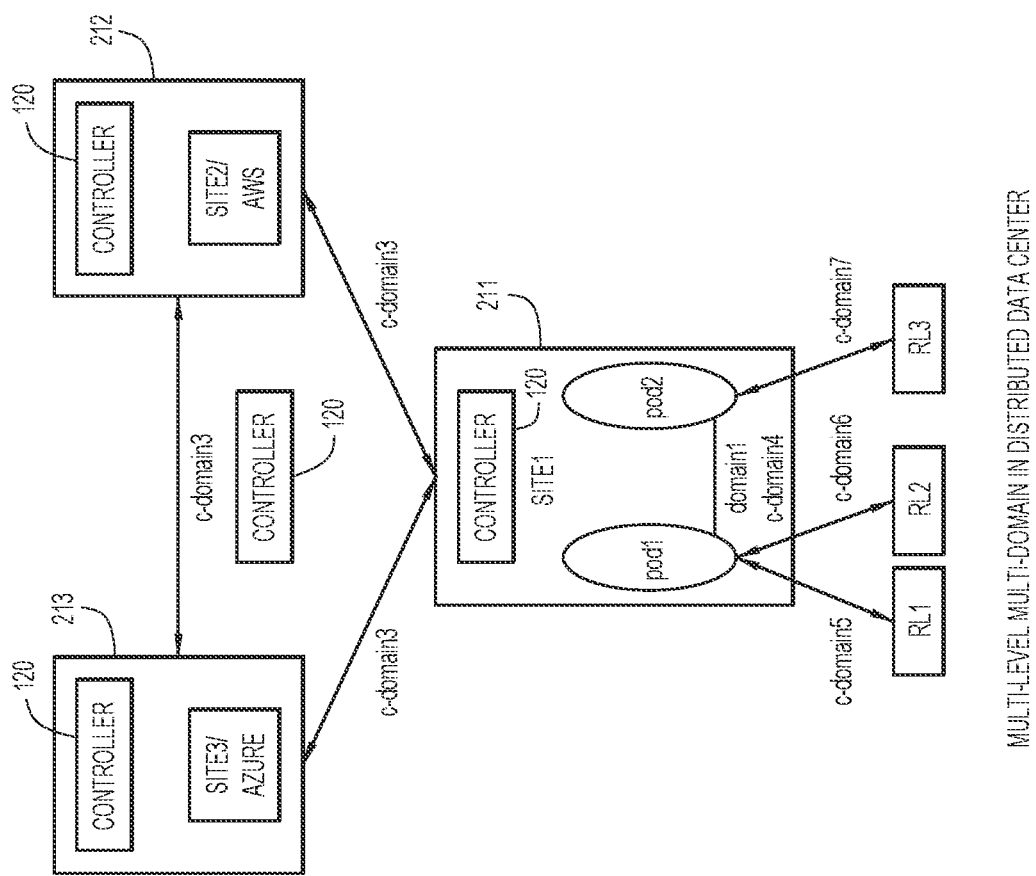
FIG. 2 shows a multi-level, multi-C-domain distributed data center topology in accordance with an example embodiment.

FIG. 2 shows a multi-level, multi-C-domain distributed data center topology in accordance with an example embodiment. This figure depicts how different C-domains can be at different levels. For instance, there can be a global C-domain for multi-sites (C-domain3 for Site1 211, Site2 212, Site3 213), a single site can have a C-domain (C-domain4) for fabric-connected multi-pods (pod1, pod2), and each pod can still further have multiple C-domains (C-domains, C-domain6, C-domain7) for fabric-connected remote-leaves (RL1, RL2, RL3). Note that a given endpoint can participate in multiple C-domains at different levels. For instance, a spine switch (not shown) in site 1 211 can be a member of the multi-site C-domain3, and of the multi-pod C-domain4, as well as of the remote leaf C-domain5 or C-domain6 at the same time.

Given that a single endpoint can participate in multiple C-domains, embodiments also provide a mechanism to differentiate CloudSec protocol packets for different instances and maintain different states of each concurrently running CloudSec state machine. The mechanism includes the use of a globally unique domain-id for each C-domain (C-domain GUDID), which can be statically configured, auto-generated, or elected by all members of a given C-domain. The C-domain GUDID may be carried in key negotiation protocol messages in multi-domain capable CloudSec protocol stack. For purposes of backward compatibility, if a CloudSec message is received with no C-domain GUDID specified, a default C-domain GUDID of 1 may be assumed, where such a value is reserved for un-partitioned legacy CloudSec deployments.

In an embodiment, each C-domain may have its own domain key controller to orchestrate its key negotiation, and its own transport controller to pass CloudSec control messages. In existing single domain multi-site CloudSec deployments, an SDN controller at each site, acts as a domain key controller for each site. A Multi-site Orchestrator (MSO), may act as the domain transport controller. In a multi-domain embodiment, each domain key controller may be any network device, including an SDN controller or physical/virtual switch/router, in or outside the data center, as long as it has IP network connections with all the members in the domain. Strategically selecting an appropriate controller can help distribute the load and utilize the computing resources in data center and cloud environment.

Domain message transport can be performed over a virtual overlay connection on the same data plane network. In one possible implementation, a separate virtual overlay connection for CloudSec control plane and data plane may be indicated if they share the same physical WAN connection.

Figure 3:
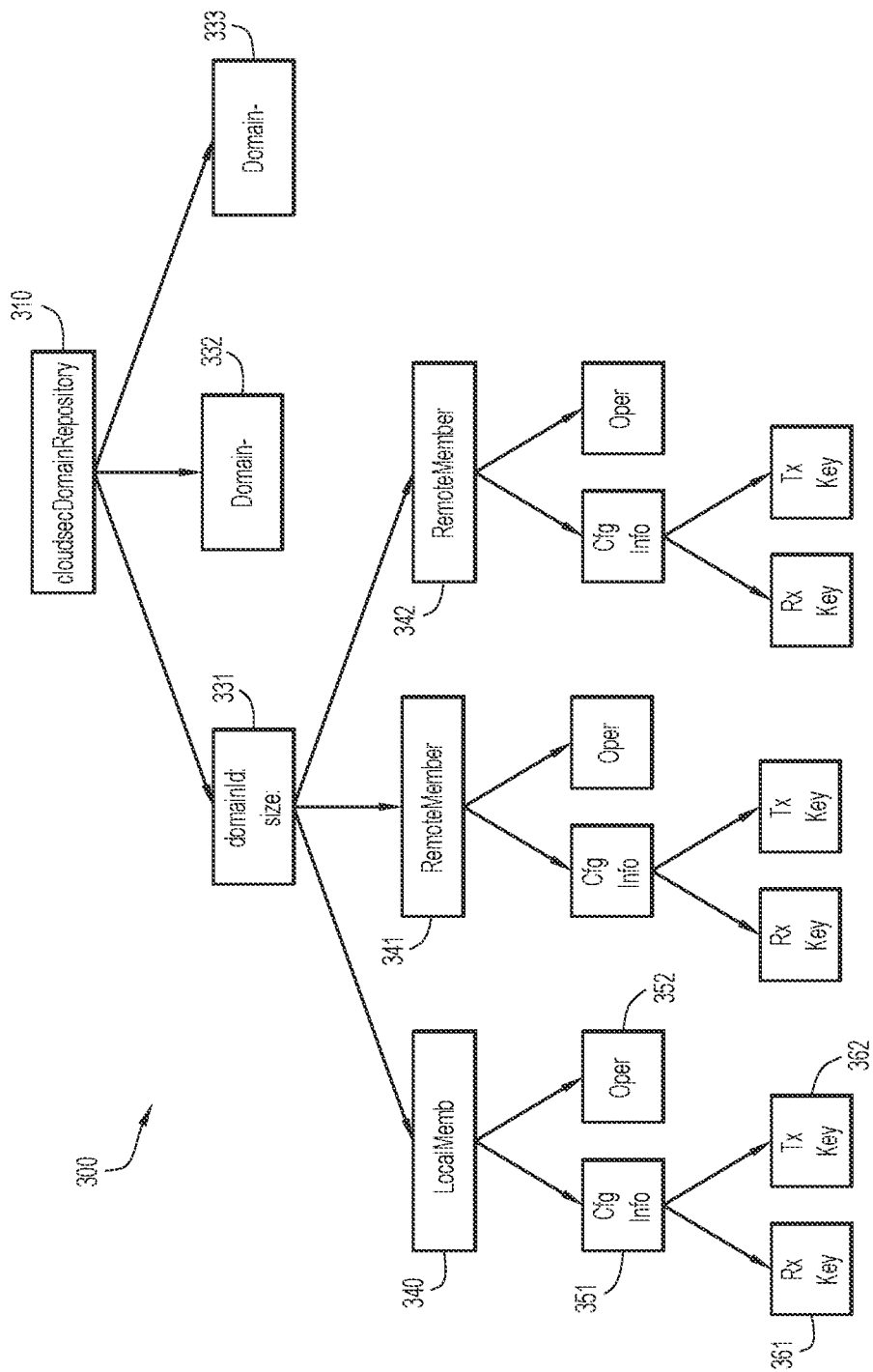
FIG. 3 illustrates a hierarchical structure of a multi-domain CloudSec repository in accordance with an example embodiment.

As noted, an SDN controller or any other device, can act as a domain key controller for multiple CloudSec domains. In such a case, the SDN controller (e.g., controller 120 of FIG. 1) can maintain multiple CloudSec management object subtrees, each identified by its own C-domain GUDID, and each such subtree may contain both configuration objects as well as operational objects for each member within the C-domain. FIG. 3 illustrates a hierarchical structure of a multi-domain CloudSec repository 310 in accordance with an example embodiment. At least aspects of multi-domain CloudSec repository 310 may be stored in, e.g., a controller, such as the controller 120 of FIG. 1. That is, the highest level in repository tree 300 of FIG. 3 can be stored in controller 120 so that a given CloudSec message can be properly routed to its appropriate repository 331, 332, 333, which is addressable via the C-domain GUDID. Taking repository 331 as an example, information about a local member 340, and remote members 341, 342 are stored. For each such member, configuration objects 351 and configuration objects 352 may be stored. And receive (Rx) key 361 and transmit (Tx) key 362 data may also be stored, thus enabling the encryption and decryption of packets between two endpoints (one of which is, e.g., local member 340), and enabling CloudSec between sites, even across public networks.

Figure 4:
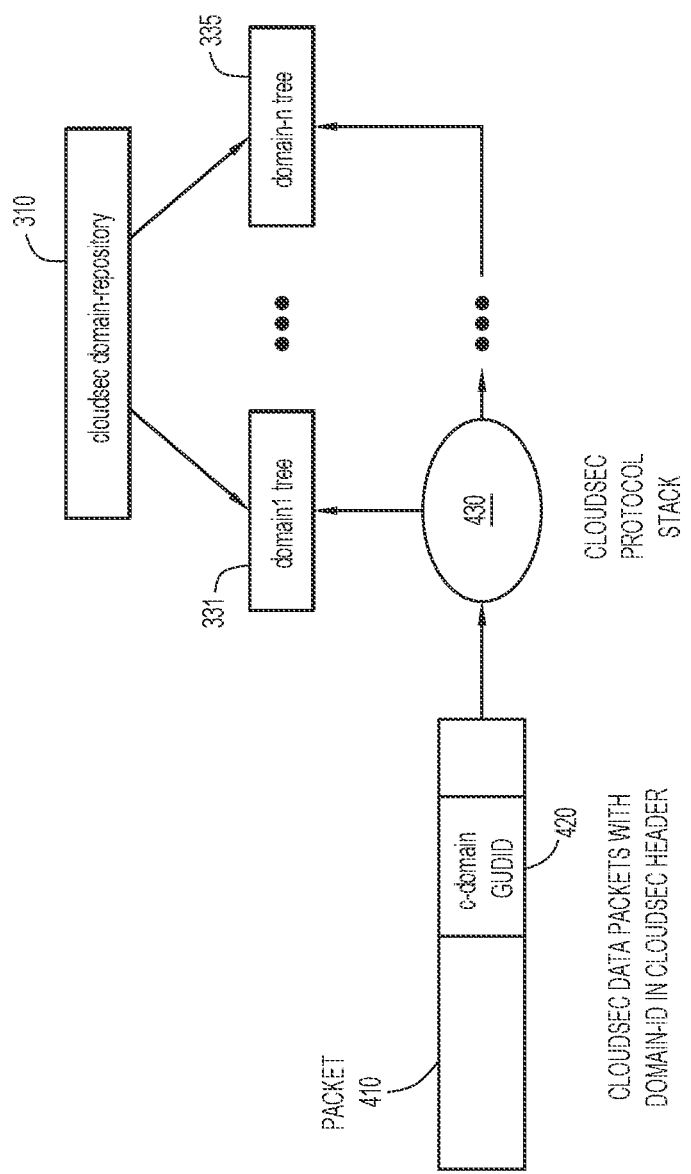
FIG. 4 shows handling of a CloudSec message packet in a multi-domain CloudSec deployment in accordance with an example embodiment.

FIG. 4 shows handling of a CloudSec message packet in a multi-domain CloudSec deployment in accordance with an example embodiment. When processing control messages, controller 120, or multi-domain CloudSec logic 150, may extract from a header of a given control message packet 410 a C-domain GUDID 420 and use the same as an index to locate and use its designated repository. The C-domain GUDID 420 can be stored in any available field of such a packet. When a given control message packet 410 with embedded C-domain GUDID 420 is received, CloudSec protocol stack 430 extracts the C-domain GUDID 420 and uses that as the key to look up its relevant domain subtree (e.g., 331, 332, or 333) in multi-domain CloudSec repository 310, such that each CloudSec state machine engine can run independently without affecting one another.

In one possible implementation, and as noted previously, in each CloudSec domain (e.g., C-domain3 of FIG. 2), separate control-plane and data-plane channels may be instantiated. The control plane channel may be used to negotiate CloudSec key information, and may be independently secured by a network security mechanism such as transport layer security (TLS), which does not require line-rate encryption/decryption. The data plane channel is then secured via the keys negotiated over control plane, and data plane encryption/decryption can then be at line-rate.

Figure 5:
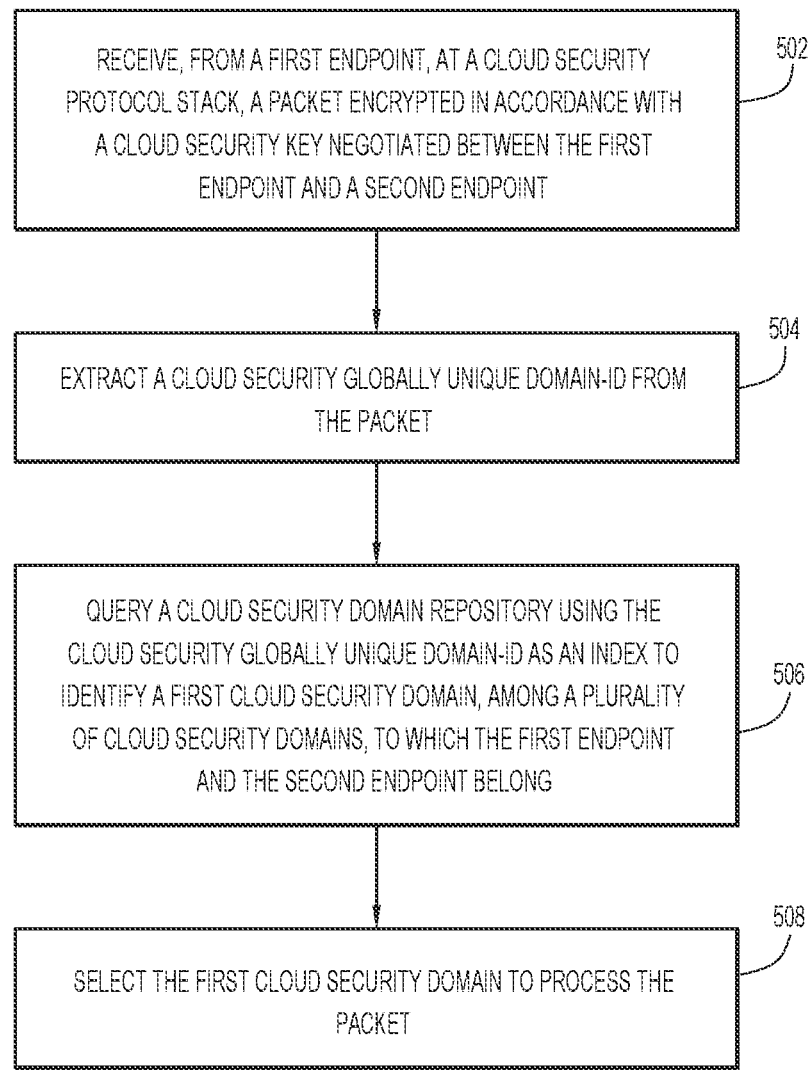
FIG. 5 is a flowchart illustrating a series of operations associated with implementing multi-domain CloudSec in accordance with an example embodiment.

FIG. 5 is a flowchart illustrating a series of operations associated with implementing multi-domain CloudSec in accordance with an example embodiment. The operations illustrated in FIG. 5 may be performed, at least in part, by, e.g., multi-domain CloudSec logic 150 hosted by controller 120 (shown in FIG. 1). At 502, an operation receives, from a first endpoint, at a cloud security protocol stack, a packet encrypted in accordance with a cloud security key negotiated between the first endpoint and a second endpoint. At 504, an operation extracts a cloud security globally unique domain-id from the packet. At 506, an operation queries a cloud security domain repository using the cloud security globally unique domain-id as an index to identify a first cloud security domain, among a plurality of cloud security domains, to which the first endpoint and the second endpoint belong. And, at 508, an operation selects the first cloud security domain to process the packet.

In sum, described herein are approaches to implement multi-domain cloud security that enables packet encryption between a first endpoint and a second endpoint, even across public networks, and with the endpoints possibly operating as disparate object classes. The approaches support heterogeneous security mechanisms and topologies. With such CloudSec domain partitioning, it is possible to not only increase scalability and efficiency (i.e., reduce a number of messages from $O(n^2)$ to $O(n)$ just for remote leaf cases), but it is also possible to increase security as a security breach will be contained within a given CloudSec domain boundary. Furthermore, with the disclosed approaches it is possible to create hierarchical structures between domains such as designating a master domain and secondary domain.

The embodiments provide a multi-domain extension to CloudSec by partitioning CloudSec members into a hierarchical tree of C-domains for multi-domain (SDA, SDWAN, Data center) and multi-site network environments.

The embodiments enable concurrent C-domain support with each C-domain comprising a set of members which can run a CloudSec key exchange protocol to negotiate set of Tx/Rx keys and trigger periodical rekey transactions.

Each C-domain may have its own unique domain id (CloudSec GUDID) to identify its domain association so a network device can participate in different CloudSec domains. At the same time, control messages are segregated via the CloudSec GUDID so that key exchange protocols in different domain can run concurrently on a same device.

Further, each network device that participates in one or multiple C-domains has a CloudSec state repository organized in a tree structure, with each C-domain having its own subtree storing control and operational data reflecting the states of its local and remote members of each domain. The data separation ensures CloudSec key negotiation and rekey process in each domain will run independently without interfering with each other.

Further still, each C-domain can have a separate domain protocol controller as well as protocol transport controller so they can be run on different controllers, as well as on switches: routers.

The described embodiments provide several advantages. The approaches can support multiple instances of cloud security sessions concurrently in multi-domain (SDA, SDWAN) as well as multi-site, multi-pod, remote-leaf virtual-leaf and hybrid-cloud data center network topologies.

CloudSec sessions in different C-domains will negotiate CloudSec Tx/Rx keys concurrently and security-breach in one C-domain will not affect other C-domains.

Multi-domain CloudSec partitions can increase efficiency and scalability by effectively reducing key negotiation messages. In general, with a complete k-ary C-domain expansion tree of height h, each leaf domain has only $1/k^h$ of the original key exchange message cost. In a site with two levels of fallout factor of 10 partitioning, it si possible to achieve two orders of magnitude reduction in terms of key exchange overhead.

For a remote-leaf case, the number of key negotiation messages may be reduced from $O(n^2)$ to $O(n)$.

The multi-domain approach is also inter-operable with single instance implementation of CloudSec by using a default CloudSec GUDID.

These approaches and embodiments can be used in different network environments (multi-domain, multi-site, on-prem; hybrid-cloud data censers with different types of topology and security requirements) with different key lengths and encryption/decryption algorithms.

The domain protocol stack can be run on an SDN controller, as well as on physical/virtual Switch/Routers in a distributed fashion.

FIG. 6 depicts a device 600 (e.g., a controller) that executes multi-domain CloudSec logic 150 in accordance with an example embodiment. It should be appreciated that FIG. 6 provides only an illustration of one embodiment and does not imply any limitations with regard to the environments in which different embodiments may be implemented. Many modifications to the depicted environment may be made. Indeed, in many implementations of a controller configured to host multi-domain CloudSec logic 150, much of the hardware described below may not be needed.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the "resource allocation logic" may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving, from a first endpoint, at a cloud security protocol stack, a packet encrypted in accordance with a cloud security key negotiated between the first endpoint and a second endpoint; extracting a cloud security globally unique domain-id from the packet; querying a cloud security domain repository using the cloud security globally unique domain-id as an index to identify a first cloud security domain, among a plurality of cloud security domains, to which the first endpoint and the second endpoint belong; and selecting the first cloud security domain to process the packet.

In an embodiment, a cloud security key negotiation between the first endpoint and the second endpoint in the first cloud security domain does not impact a third endpoint that is a member of a second cloud security domain.

In an embodiment, the method may include partitioning a plurality of endpoints, including the first endpoint and the second endpoint, into a plurality of cloud security domains, each with its own cloud security globally unique domain-id.

In an embodiment, the first cloud security domain spans at least two network sites that are connected via a public network.

In one implementation, the first cloud security domain includes a local member and a remote member, wherein the local member operates in accordance with a first object class, and the remote member operates in accordance with a second object class, different from the first object class.

In another implementation, the first cloud security domain includes a remote leaf.

In still another implementation, the first endpoint is a member of the first cloud security domain and also a member of a second cloud security domain, different from the first cloud security domain.

In an embodiment, the method may include performing the method at a software defined network controller.

In an embodiment, the method may be performed by one of a switch or a router.

In an embodiment, the cloud security globally unique domain-id is one of statically configured, auto-generated, or elected by all members of the first cloud security domain.

In another form, a device may also be provided in accordance with an embodiment. The device may include an interface unit configured to enable network communications; a memory; and one or more processors coupled to the interface unit and the memory, and configured to: receive, from a first endpoint, at a cloud security protocol stack, a packet encrypted in accordance with a cloud security key negotiated between the first endpoint and a second endpoint; extract a cloud security globally unique domain-id from the packet; query a cloud security domain repository using the cloud security globally unique domain-id as an index to identify a first cloud security domain, among a plurality of cloud security domains, to which the first endpoint and the second endpoint belong; and select the first cloud security domain to process the packet.

In an embodiment, a cloud security key negotiation between the first endpoint and the second endpoint in the first cloud security domain does not impact a third endpoint that is a member of a second cloud security domain.

In another embodiment, the one or more processors are further configured to partition a plurality of endpoints, including the first endpoint and the second endpoint, into a plurality of cloud security domains, each with its own cloud security globally unique domain-id.

In an embodiment, the first cloud security domain spans at least two network sites that are connected via a public network.

In an embodiment, the first cloud security domain includes a local member and a remote member, wherein the local member operates in accordance with a first object class, and the remote member operates in accordance with a second object class, different from the first object class.

In an embodiment, the first cloud security domain includes a remote leaf.

In an embodiment, the first endpoint is a member of the first cloud security domain and also a member of a second cloud security domain, different from the first cloud security domain.

In still another form, a non-transitory computer readable storage media is provided that is encoded with instructions that, when executed by a processor, cause the processor to receive, from a first endpoint, at a cloud security protocol stack, a packet encrypted in accordance with a cloud security key negotiated between the first endpoint and a second endpoint; extract a cloud security globally unique domain-id from the packet; query a cloud security domain repository using the cloud security globally unique domain-id as an index to identify a first cloud security domain, among a plurality of cloud security domains, to which the first endpoint and the second endpoint belong; and select the first cloud security domain to process the packet.

In an embodiment, a cloud security key negotiation between the first endpoint and the second endpoint in the first cloud security domain does not impact a third endpoint that is a member of a second cloud security domain.

In an embodiment, the instructions, when executed by a processor, cause the processor to partition a plurality of endpoints, including the first endpoint and the second endpoint, into a plurality of cloud security domains, each with its own cloud security globally unique domain-id.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, from a first endpoint, at a cloud security protocol stack, a packet encrypted in accordance with a cloud security key negotiated between the first endpoint and a second endpoint;
   extracting a cloud security globally unique domain-id from the packet;
   querying a cloud security domain repository using the cloud security globally unique domain-id as an index to identify a first cloud security domain, among a plurality of cloud security domains, to which the first endpoint and the second endpoint belong; and
   selecting the first cloud security domain to process the packet,
   wherein the first cloud security domain is segregated from other cloud security domains in the plurality of cloud security domains such that key exchange protocols in different cloud security domains run concurrently on at least one of the first endpoint and the second endpoint.

2. The method of claim 1, wherein a cloud security key negotiation between the first endpoint and the second endpoint in the first cloud security domain does not impact a third endpoint that is a member of a second cloud security domain.

3. The method of claim 1, further comprising partitioning a plurality of endpoints, including the first endpoint and the second endpoint, into the plurality of cloud security domains, each with its own cloud security globally unique domain-id.

4. The method of claim 3, wherein the first cloud security domain spans at least two network sites that are connected via a public network.

5. The method of claim 3, wherein the first cloud security domain includes a local member and a remote member, wherein the local member operates in accordance with a first object class, and the remote member operates in accordance with a second object class, different from the first object class.

6. The method of claim 3, wherein the first cloud security domain includes a remote leaf.

7. The method of claim 3, wherein the first endpoint is a member of the first cloud security domain and also a member of a second cloud security domain, different from the first cloud security domain.

8. The method of claim 1, further comprising performing the method at a software defined network controller.

9. The method of claim 1, further comprising performing the method by one of a switch or a router.

10. The method of claim 1, wherein the cloud security globally unique domain-id is one of statically configured, auto-generated, or elected by all members of the first cloud security domain.

11. A device comprising:
    an interface configured to enable network communications;
    a memory; and
    one or more processors coupled to the interface unit and the memory, and configured to:
      receive, from a first endpoint, at a cloud security protocol stack, a packet encrypted in accordance with a cloud security key negotiated between the first endpoint and a second endpoint;
      extract a cloud security globally unique domain-id from the packet;
      query a cloud security domain repository using the cloud security globally unique domain-id as an index to identify a first cloud security domain, among a plurality of cloud security domains, to which the first endpoint and the second endpoint belong; and
      select the first cloud security domain to process the packet,
    wherein the first cloud security domain is segregated from other cloud security domains in the plurality of cloud security domains such that key exchange protocols in different cloud security domains run concurrently on at least one of the first endpoint and the second endpoint.

12. The device of claim 11, wherein a cloud security key negotiation between the first endpoint and the second endpoint in the first cloud security domain does not impact a third endpoint that is a member of a second cloud security domain.

13. The device of claim 11, wherein the one or more processors are further configured to partition a plurality of endpoints, including the first endpoint and the second endpoint, into the plurality of cloud security domains, each with its own cloud security globally unique domain-id.

14. The device of claim 13, wherein the first cloud security domain spans at least two network sites that are connected via a public network.

15. The device of claim 13, wherein the first cloud security domain includes a local member and a remote member, wherein the local member operates in accordance with a first object class, and the remote member operates in accordance with a second object class, different from the first object class.

16. The device of claim 13, wherein the first cloud security domain includes a remote leaf.

17. The device of claim 13, wherein the first endpoint is a member of the first cloud security domain and also a member of a second cloud security domain, different from the first cloud security domain.

18. A non-transitory computer readable storage media encoded with instructions that, when executed by a processor, cause the processor to:
  receive, from a first endpoint, at a cloud security protocol stack, a packet encrypted in accordance with a cloud security key negotiated between the first endpoint and a second endpoint;
  extract a cloud security globally unique domain-id from the packet;
  query a cloud security domain repository using the cloud security globally unique domain-id as an index to identify a first cloud security domain, among a plurality of cloud security domains, to which the first endpoint and the second endpoint belong; and
  select the first cloud security domain to process the packet,
  wherein the first cloud security domain is segregated from other cloud security domains in the plurality of cloud security domains such that key exchange protocols in different cloud security domains run concurrently on at least one of the first endpoint and the second endpoint.

19. The non-transitory computer readable storage media of claim 18, wherein a cloud security key negotiation between the first endpoint and the second endpoint in the first cloud security domain does not impact a third endpoint that is a member of a second cloud security domain.

20. The non-transitory computer readable storage media of claim 19, wherein the instructions, when executed by a processor, cause the processor to partition a plurality of endpoints, including the first endpoint and the second endpoint, into the plurality of cloud security domains, each with its own cloud security globally unique domain-id.

* * * * *